United States Patent

Hoagland, Jr.

[15] 3,659,242
[45] Apr. 25, 1972

[54] OVERCURRENT RESPONSIVE DEVICE

[72] Inventor: Porter Hoagland, Jr., Rumson, N.J.

[73] Assignee: Hoagland Instrument Company, Red Bank, N.J.

[22] Filed: Feb. 4, 1970

[21] Appl. No.: 8,534

Related U.S. Application Data

[63] Continuation-in-part of Ser. No. 737,428, June 17, 1968, Pat. No. 3,544,943.

[52] U.S. Cl. ............................................337/139, 337/379
[51] Int. Cl. .............H01h 37/46, H01h 37/52, H01h 61/013
[58] Field of Search....................337/139, 393, 396, 397, 36, 337/37, 38, 39, 40, 49, 62, 111, 329

[56] References Cited

UNITED STATES PATENTS

| | | | |
|---|---|---|---|
| 2,683,199 | 7/1954 | Spires, Jr. | 337/40 |
| 3,076,881 | 2/1963 | Bastian | 337/139 X |
| 2,412,483 | 12/1946 | Warrington | 337/139 |
| 2,130,829 | 9/1938 | Ackermann | 337/139 UX |

FOREIGN PATENTS OR APPLICATIONS

| | | | |
|---|---|---|---|
| 1,136,888 | 12/1968 | Great Britain | 337/49 |
| 1,036,355 | 8/1958 | Germany | 337/111 |
| 1,075,708 | 2/1960 | Germany | 337/38 |

Primary Examiner—Bernard A. Gilheany
Assistant Examiner—Dewitt M. Morgan
Attorney—Harry B. Rook

[57] ABSTRACT

An electrical device which exhibits a predetermined physical distortion when exposed to current in excess of that to which it is normally subjected. The device comprises a thermally responsive assembly in the form of a cantilevered element comprising two elements at least one of which may be connected in series with a circuit to be monitored, an overcurrent causing heating and flexure of the element, movement of the element being transmitted to a switching device. The cantilevered element comprises a pair of elongated conductors connected in parallel and the response time of the device may be matched to that of an appliance to be protected by varying the materials and/or configuration of the members of the cantilevered element.

4 Claims, 6 Drawing Figures

INVENTOR.
Porter Hoagland, Jr.
BY
Harry B. Cook
ATTORNEY

PATENTED APR 25 1972 3,659,242
SHEET 2 OF 2
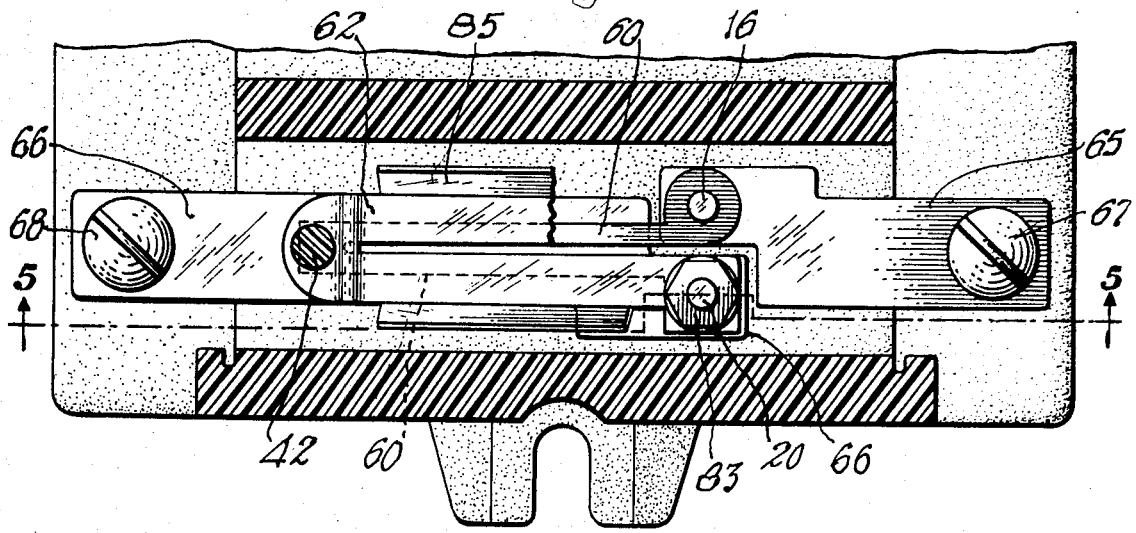
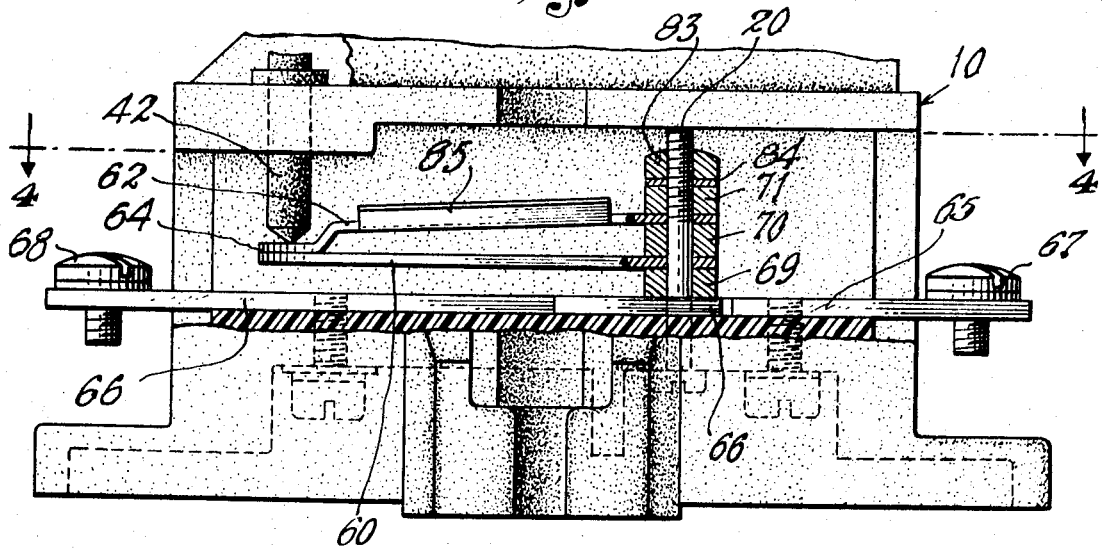
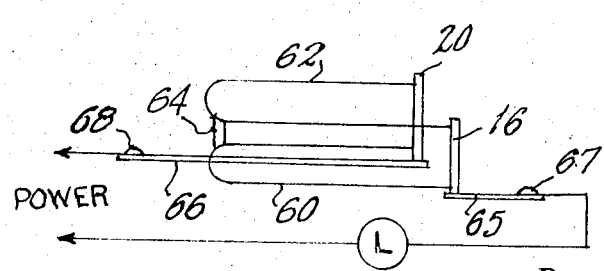
INVENTOR.
Porter Hoagland, Jr.,
BY
Harry B. Cook,
ATTORNEY

OVERCURRENT RESPONSIVE DEVICE

This application is a continuation-in-part of my co-pending application Ser. No. 737,428, filed June 17, 1968 and now U.S. Pat. No. 3,544,943.

BACKGROUND OF THE INVENTION

1. Field of the Invention

The present invention relates to the protection of electrical appliances and the like. More particularly, the present invention is directed to overcurrent responsive devices which may be employed to protect an electrical load, at least a portion of the load current flowing through the device. Accordingly, the general objects of the present invention are to provide novel and improved methods and apparatus of such character.

2. Description of the Prior Art

While not limited thereto in its utility, the present invention is particularly well suited for use in the protection of motors against damage due to overload. In the past, it has been standard practice to design motors so as to enable them to withstand current considerably in excess of that for which they were rated. This "over design" was, of course, expensive and in order to reduce costs present motors employ less copper and iron. Restated, partly as a result of the availability of higher temperature insulating materials, motor design now concentrates upon providing the smallest and lightest motor possible which will adequately meet the needs of the particular application. As motor design practice has changed, there has simultaneously evolved a need for improved overload protection devices. The overload devices employed with prior art motors did not provide for precise enough calibration and control to adequately protect modern, light-weight motors.

Continuing, for purposes of example only, a discussion of the art of protection of rotating electrical machinery, obviously the protective device which is suitable for use with a heavy duty motor of a given horsepower will not safety guard against damage of another motor with the same horsepower but designed for an application which does not require overload operation. In short, the only solution to the design of motor overload relays is to provide a protective device which may be matched to the curve of the machine which is to be protected.

In the past, a considerable number of electromechanical switching devices have been proposed and, in some cases, fabricated. The form of device to which the present invention is directed may be generally referred to as a thermal switch of the cantilevered type. In the prior art, such cantilevered switches have been employed in time delay relays, overvoltage and undervoltage relays and numerous other devices having utility in the protection of rotating machinery and elsewhere. However, these prior cantilevered, thermal switching devices have been characterized by certain inherent deficiencies. For example, the design of these prior art devices has been contrary to the necessary flexibility and has thus precluded the variation of the inverse time v. overload current reaction curves of the devices without resorting to complete redesign. Also, prior art thermal switches of the cantilevered type have typically employed a heater element through which the overload current was caused to pass and, partly as a result of the use of conventional thermally activated elements, prior art switching devices of this type have had comparatively slow response times. It should be noted that, in order to provide "quick trip" relays, the prior art has typically employed thermal elements which heat rapidly under fault or short circuit conditions and, as is well known, such elements are subject to failure under extreme overload conditions and, in any event, will normally fail in time.

SUMMARY OF THE INVENTION

The present invention overcomes the above-discussed and numerous other disadvantages of the prior art by providing a novel thermal switch of the cantilevered type wherein there are two conductors at least one of which will heat and expand in relation to the other as the result of carrying excess currents. A thermally responsive assembly includes the cantilevered element of the present invention which is comprised of two metallic members that are constructed and connected in circuit in such a way as to force the current to be monitored either entirely through one member or disproportionately in both members where the members are selected so as to have different resistances. In the first case, as described in a co-pending application all of the current passes through one member which preferably is bifurcated with the arms connected in series circuit so that only the bifurcated strip is heated by the current. In the latter case, as described and claimed herein, these two members both of which are good conductors, are electrically connected in parallel with each other and in series with a circuit which is to be monitored. Upon the occurrence of an overload in the monitored circuit, maximum current will pass through the member having the lower resistance causing rapid heating and thus expansion of this member with the resulting flexure of the cantilevered element. Movement of the cantilevered element will be transmitted to a switching mechanism which will perform the actual circuit breaking or closing function. The two members which comprise the cantilevered element may be sized and/or fabricated from materials having different resistivities so as to enable the device to have the desired inverse time v. current response and a selected cantilevered element may readily be installed in operative relationship with the switching mechanism and other components of the device.

Accordingly, it may be seen that an object of the present invention is to provide a thermally responsive switching device which can be caused to have various inverse time delay trip times without requiring significant differences in the elements comprising the device.

It is also an object of the present invention to provide a thermal switch which exhibits a faster response to overcurrents than prior art devices of like character.

It is another object of the present invention to eliminate the need for bimetallic elements in overload relays and circuit breakers.

It is yet another object of the present invention to provide an overload relay which reacts quickly to excess currents and yet will withstand short circuit currents.

It is still another object of the present invention to provide a thermally responsive, overload relay which may be self-compensating for variations in ambient temperature.

It is also an object of the present invention to provide a thermally responsive, overload relay which does not employ an independent heater element and does not rely for operation upon the exchange of thermal energy between components of the device.

A BRIEF DESCRIPTION OF THE DRAWING

The present invention may be better understood by referring to the accompanying drawing in which:

FIG. 4 is a top plan view of a second embodiment of the invention, partially in section on the plane of line 4—4 of FIG. 5, and with portions broken away for clearness in illustration;

FIG. 5 is a partial side view and partial sectional view, taken along the line 5—5 of FIG. 4, and FIG. 6 is a schematic wiring diagram.

DESCRIPTION OF THE PREFERRED EMBODIMENT

Figure 1:
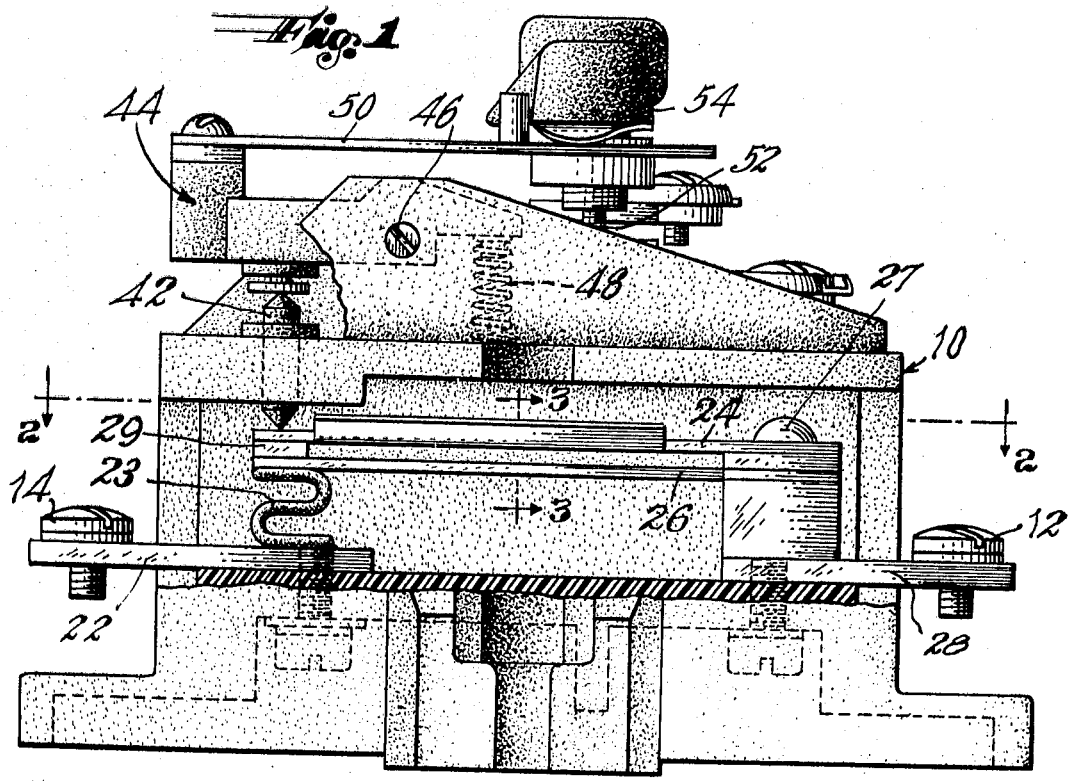
FIG. 1 is a cross-sectional, side elevation view of a first embodiment of the present invention.

The embodiment of the present invention shown in FIG. 1 comprises a body of frame of rigid insulating material which is indicated generally at 10. The switching device of FIG. 1 will be connected in series with a circuit to be monitored by means of terminals 12 and 14. As may best be seen from FIG. 2, terminal 12 is electrically connected to a post 27.

Figure 2:
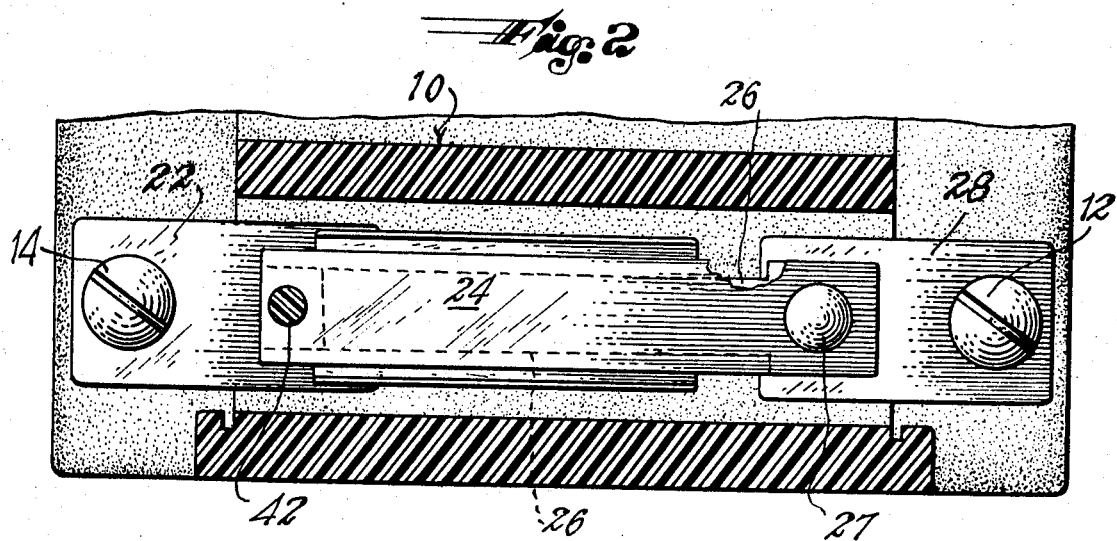
FIG. 2 is a top view, taken along line 2—2 of FIG. 1, depicting the embodiment of FIG. 1 partly in section.
Figure 3:
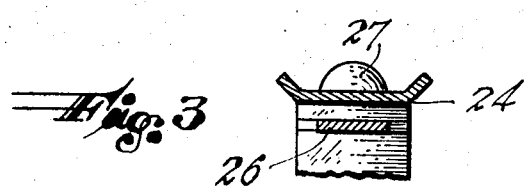
FIG. 3 is a view taken along the line 3—3 of FIG. 1, depicting the cantilevered thermally responsive switching element of the embodiment of FIGS. 1 and 2.

A thermally responsive element or assembly is shown in FIGS. 1, 2 and 3 as comprised of two elongated members 24 and 26 supported at one end from a post 27 so that the thermally responsive element is cantilevered. These two members are connected in parallel circuit with each other and in series with the circuit being monitored, both members are thus mechanically and electrically connected to the post 27 with their other ends mechanically and electrically connected at 29 and electrically connected by a pigtail 23 and conductor 22 to terminal 14.

The parallel connection, in combination with the use of different materials or different cross-sectional areas, results in different current flowing through the two members of the cantilevered device. The member having the lower electrical resistance will heat up more than the other element since it has a higher $I^2 R$ loss in spite of the slightly higher resistance of the other element. Under normal circuit conditions both members will be heated slightly and will expand to some extent. However, the net deflection of the cantilevered device is less under normal current conditions than the deflection which will occur when a relatively high current, indicative of the fault condition, is passed through the device. Under overload conditions, the member having the lower resistance, for example, member 26 in the embodiment of FIG. 1, will rapidly heat up and expand without concurrent heating of the other member and thus very rapid deflection of the cantilevered element results. In a movement of the ends of the members which are remote from the supporting post to be transmitted through a rod 42 which contacts a pivotally mounted operating mechanism, indicated generally at 44 which controls a snap-action switch. Mechanism 44 pivots about bolt 46 and is spring-loaded against the cantilevered thermally responsive element by means of a spring 48. Movement of rod 42 is transmitted to the snap-action switch by means of a lever arm 50. The snap-action switch is itself of conventional design and thus has not been shown and will not be described herein. Suffice it to say that the snap-action switch is operated by adjustment screw 52 which engages lever 50 and the tripping force for the snap-action switch may be controlled by rotating adjustment knob 54 to thereby set the initial force applied to the snap action switch by screw 52. A particularly unique feature of the present invention resides in the fact that it may be made self-compensating for variations in ambient temperature. This is accomplished by employing a bimetallic strip for lever arm 50, arm 50 itself being cantilevered from support means 51 of mechanism 44. Variations in the curvature of arm 50 will, of course, be transmitted by adjustment screw 52 to the snap-action switch so that the tripping force may be caused to vary inversely with ambient temperature.

In the specific embodiment of FIGS. 1 and 2, the strip 24 employs a high resistance while the strip 26 has a low resistance and the post 27 is connected to the terminal 12 via conductor 28. At their ends remote from the post 27 the strips are electrically connected together, for example by means of welding or brazing both strips to their intermediate spacer 29 of conductive material. The free end of the cantilevered strips 24 and 26 is in operative mechanical contact with the movable rod or linkage 42 of nonconductive material.

In operation, current flowing between terminals 12 and 14 under normal conditions will divide between the parallel connected, cantilevered strips 24 and 26. However, when an overload occurs, the "low" resistance strip 26 will initially carry substantially the entire excess current and this "high expanding" strip will heat up rapidly. Expansion of strip 26 relative to strip 24 will cause upward flexing of the free end of the cantilevered device thereby forcing rod 42 upward and, through the action described above, tripping the snap-action switch.

An important advantage of the apparatus embodying the invention is that "sudden" heavy overloads actually result in lower temperatures at any given point (or place) within the members than do moderate overloads because the low expansion member (in each case) has less time to expand during "heavy" or "sudden" overloads, and the switch is tripped before extreme temperatures are developed. This is a highly desirable self-protecting feature.

The invention also contemplates the changing of the differentials between the two members whereby different characteristic curves can be obtained; for example, changing of the materials of which the members are made, or changing the relative dimensions of the members, may vary the differentials in resistance, conductivity and thermal sensitivity.

FIGS. 4 and 5 show a modification of the invention wherein both thermally responsive conductive members are bifurcated, and each thereof has one leg rigidly mechanically connected to a supporting post 16 and each member has its other leg rigidly mechanically and electrically connected to another post 20. Said conductive members 60 and 62 are rigidly mechanically and electrically connected together at their free ends as indicated at 64. The posts 16 and 20 are mechanically and electrically connected to the respective conductors 65 and 66 in which respectively are the terminal screws 67 and 68. With this construction the pigtail connection of the construction shown in FIGS. 1 and 2 is obviated. The supported ends of the members 60 and 62 are held in spaced relation to each other and to their respective conductors 65 and 66 by metal bushings 69, 70 and 71; and the members are clamped on their posts by the respective nuts 83 between which and the uppermost spacer bushing 71 is a metal washer 84. Preferably the member 62 has wing portions 85.

The size of the members 60 and 62 and the materials of which they are formed may be varied in order to accomplish the desired relationship of resistances that may be required for different situations in all of which, however, the two members are electrically connected in parallel circuit with each other and in series with the circuit to be monitored.

I claim:

1. Apparatus for establishing a preselected electrical circuit condition in response to the flow of current in excess of normal in a monitored circuit consisting of:
    a thermally responsive assembly including a first flexible conductive member having a first resistance value, a second flexible conductive member having a second resistance value, said members being capable of thermally induced expansion relatively to each other upon passage therethrough of said monitored current in excess of normal, means for fixedly supporting said assembly at one end with said members rigidly mechanically connected together at said end, means rigidly mechanically connecting the members together at their other ends and means including the first named means for electrically connecting said members in parallel circuit with each other and in series with a circuit to be monitored, and wherein the last-named means includes two conductive posts; and both of said conductive members are bifurcated and each has one leg mechanically and electrically connected to one of said posts; and each post has terminal means providing for connection of said conductive members in parallel circuit with each other and in series with the circuit to be monitored.

2. Apparatus for establishing a preselected electrical circuit condition in response to the flow of current in excess of normal in a monitored circuit consisting of:
    a first elongated conductive member having high current carrying capabilities and a first resistance value, said first member also being capable of thermally induced expansion and contraction;
    a second elongated conductive member having high current carrying capabilities and a second resistance value, the resistance of said second member exceeding that of said first member, said second member being capable of flexing and being substantially equal in length to said first member;

means fixedly supporting said first and second conductive members in spaced apart relationship adjacent the first ends thereof;

means electrically and mechanically interconnecting the unsupported second ends of said conductive members;

means for electrically connecting said conductive members in parallel circuit with each other and in series with the circuit to be monitored;

electrical switch means;

means mechanically connecting the second ends of said conductive members to said switch means, said connecting means being movable and providing electrical isolation between said conductive members and said switch means, an overcurrent condition in the circuit to be monitored causing rapid heating of said first conductive member whereby said first member expands and said first and second members flex and cause movement of said connecting means, movement of said connecting means being transmitted to said switch means to cause said switch means to establish a preselected circuit condition, and wherein said first and second conductive members are bifurcated metal strips, the legs of said bifurcated strips being joined at said unsupported ends of the members.

3. The apparatus of claim 2 wherein said means supporting the first ends of said conductive members comprises:

a first post which supports one leg of said second conductive member and one leg of said first conductive member; and a second post which supports the other leg of said second conductive member and the other leg of said first conductive member.

4. The apparatus of claim 3 wherein said first and second posts are conductive and said means for electrically connecting said second ends of said conductive members to a circuit to be monitored comprises:

said conductive posts; and terminal means electrically connected to each post.

* * * * *